United States Patent
Ebert

(10) Patent No.: US 7,084,362 B2
(45) Date of Patent: Aug. 1, 2006

(54) ACTUATOR FOR A BELT LATCH MECHANISM

(75) Inventor: Bernd Ebert, Rodewisch (DE)

(73) Assignees: EAO-ESA Zweigniederlassung der EAO Lumitas GmbH, Auerbach (DE); Autoliv Development, Vergarda (SE)

( * ) Notice: Subject to any disclaimer, the term of this patent is extended or adjusted under 35 U.S.C. 154(b) by 0 days.

(21) Appl. No.: 10/508,446

(22) PCT Filed: Mar. 15, 2003

(86) PCT No.: PCT/DE03/00840

§ 371 (c)(1),
(2), (4) Date: Oct. 13, 2004

(87) PCT Pub. No.: WO03/078218

PCT Pub. Date: Sep. 25, 2003

(65) Prior Publication Data

US 2005/0146420 A1   Jul. 7, 2005

(30) Foreign Application Priority Data

Mar. 19, 2002   (DE) .......................... 202 04 318 U

(51) Int. Cl.
*H01H 9/00*   (2006.01)
(52) U.S. Cl. .................. 200/61.58 B; 200/61.62; 340/457; 24/633; 24/641
(58) Field of Classification Search ......... 200/61.58 B, 200/61.62; 340/457.1, 551, 384.1, 552; 24/633, 24/603, 641, 651

See application file for complete search history.

(56) References Cited

U.S. PATENT DOCUMENTS

| | | | | |
|---|---|---|---|---|
| 3,833,781 A | * | 9/1974 | Rumpf | 200/61.58 B |
| 3,895,196 A | * | 7/1975 | Lewis | 200/61.58 B |
| 4,015,094 A | * | 3/1977 | Gavagan et al. | 200/61.58 B |
| 4,160,887 A | * | 7/1979 | van Buren, Jr. | 200/61.62 |
| 4,163,128 A | | 7/1979 | Miskowicz | |
| 4,608,469 A | * | 8/1986 | Doty | 200/61.58 B |
| 4,920,620 A | * | 5/1990 | Yamamoto et al. | 24/641 |
| 5,590,904 A | | 1/1997 | Nill et al. | |
| 5,898,366 A | * | 4/1999 | Brown et al. | 340/457.1 |
| 6,002,325 A | | 12/1999 | Conaway | |

FOREIGN PATENT DOCUMENTS

DE   43 38 485   5/1995

OTHER PUBLICATIONS

US 5,758,393, 06/1998, Wier (withdrawn)

* cited by examiner

*Primary Examiner*—K. Richard Lee
(74) *Attorney, Agent, or Firm*—Jordan and Hamburg, LLP

(57) ABSTRACT

The invention relates to an actuator, which is used in a belt latch mechanism of restraint systems in motor vehicles and which indicates the proper locking of the tongue of the safety belt when the tongue is inserted into the belt latch mechanism. The actuator is provided in the form of a double-contact actuator, whereby the contact steel plates are arranged inside a contact space that is closed at the top, and the contact can be actuated by a slide by moving this slide into a channel situated to the side of the inner space of the housing.

11 Claims, 1 Drawing Sheet

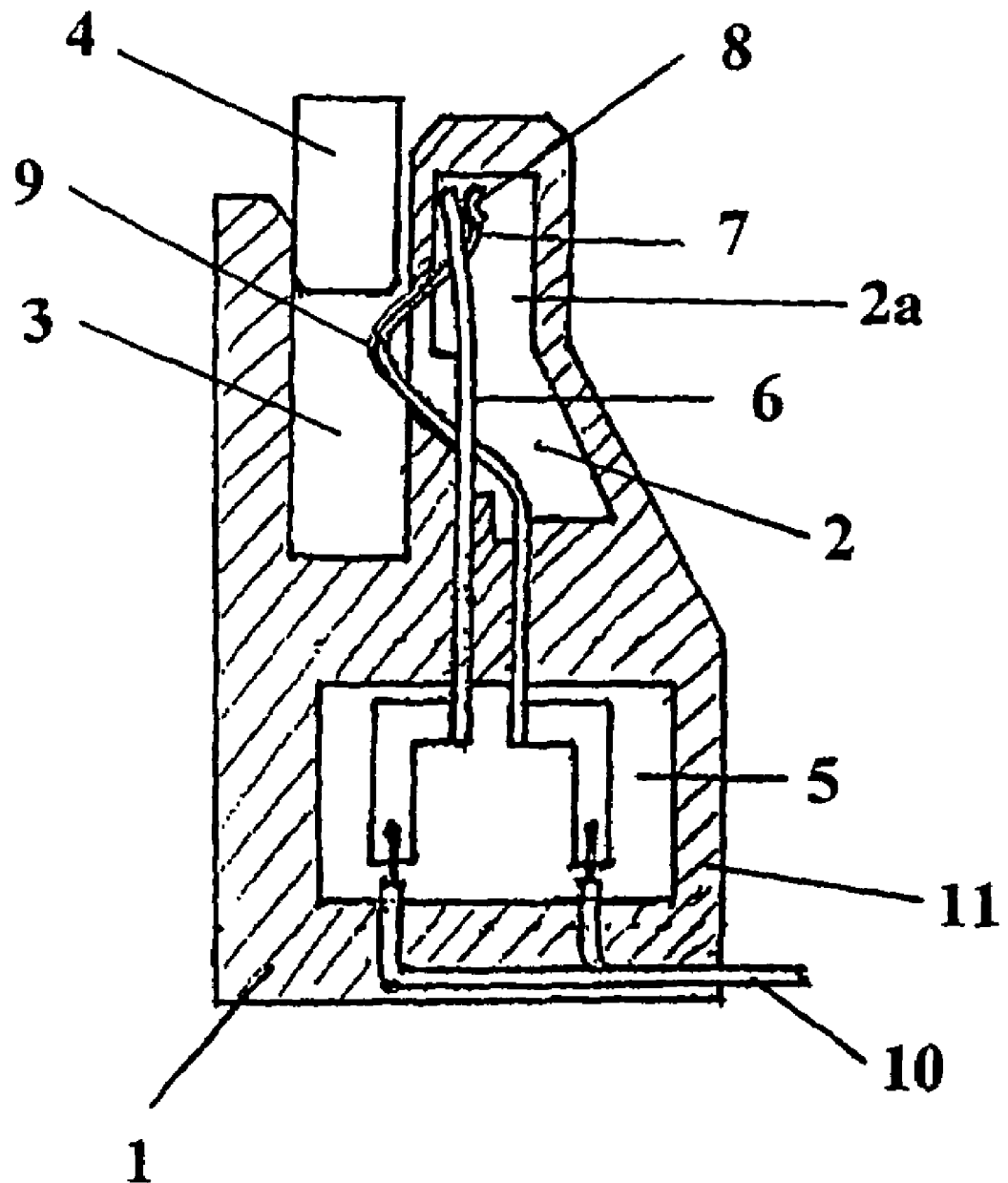

ACTUATOR FOR A BELT LATCH MECHANISM

The present invention relates to an actuator that is used in a belt buckle in retention systems in motor vehicles and that indicates the proper latching of the tongue of the safety belt inserted into the buckle.

Known from DE 43 38 485 A1 is a fail-safe checking safety belt lock with microswitch, whereby the microswitch is coupled to two function parts that are independent of the latching process for the lock such that the microswitch does not assume its closed position, which is required for actuating other functional elements of the safety device, unless the two function elements of the latch are situated in the latched position simultaneously.

Furthermore, known from Eduard Hartmann GmbH is an actuator that is used in buckles. This actuator is a double-contact actuator, the contact springs or blades of which in the unloaded condition are adjacent on opposing sides to the contact points and produce the contact. One of the two blades is embodied as a double-contact blade in order to enhance actuator reliability. The actuator is embodied such that it is arranged laterally in the buckle housing such that when the belt tongue is inserted, a slide made of an insulating material slides between the contact blades. This slide remains after the belt tongue latches between the contact blades of the actuator and thus interrupts the contact. This indicates that the safety belt is prepared and properly latched in the lock.

Since the actuator has a housing that is open on top, in order to enable the slide made of an insulating material to move between the contact blades, foreign matter such as for instance liquids or solid particles can penetrate through the opening of the buckle housing from outside. This can have a negative impact on the safety function, since contact interruption falsely signals proper latching of the belt tongue.

The contact blades curve outward in the upper area in order to make it easier to insert the slide between the contact zones. This results in a near V-shape in the upper area. Penetrating foreign matter builds up in this area and is then brought directly into the contact area by the slide.

Furthermore, automated assembly of this actuator during manufacture is not possible since the contact blades must be connected to corresponding cables before they are inserted into the actuator housing and the actuator blades are embodied such that after installation they are under a certain pre-tension. The contact blades, with the attached cables, must be inserted largely by hand into the actuator housing.

The object of the invention is therefore to embody an actuator for a buckle for safety belt systems in motor vehicles such that the contact area is largely protected from penetrating foreign matter and it is suitable for fully automated assembly during manufacture of the actuator with subsequent largely automated connection of the cable.

This object is inventively achieved in that the actuator is embodied as a double-contact actuator, whereby the contact elements are arranged in an upper closed contact space and the contact can be actuated by a slide moving in a channel arranged lateral to the interior housing space.

The actuator can be embodied as a break contact unit or a make contact unit. When the actuator is designed as a break contact unit, the contact elements penetrate on opposing sides, whereby the contact can be interrupted by the action of a slide on a contact spring. When the actuator is designed as a make contact unit, the contact elements do not penetrate, whereby in this case contact can be made by the action of a slide on a contact spring.

The contact element not actuated by the slide is embodied as a fixed contact element, whereby due to the tension force of the contact element actuated by the slide, which contact element is embodied as a contact spring, in the unactuated condition the two blades are elastically curved independent of one another. The free space required for this is provided in the interior housing space. As a result of the bending of the contact blades, contact friction occurs at the points of contact, both when breaking and making the contact. This leads to a certain self-cleaning in the contact area, which has a positive effect on the reliability of the actuator. The action of the slide on the contact spring actuates the contact. It [contact spring] is embodied in a hammer-like shape in the contact area and is designed curved such that the curved part projects into a channel arranged lateral to the interior housing space.

The hammer-shaped area of the contact spring ensures that the blades of the double-contact blade reliably make contact. The contact is actuated by the slide in that it moves when the belt tongue is inserted into the buckle. The slide strikes the curved area [of the] contact spring. As it continues to move, the curved area moves in the direction of the contact space and initiates actuation.

The invention is explained in more detail using an exemplary embodiment. The associated figure illustrates a section through the inventive actuator.

The actuator, which is designed as a break contact, comprises the actuator housing 1, which is closed by means of a cover (not shown) above the connection space 5.

The actuator has an interior housing space 2a enclosed in the contact area. A connection space 5 is provided in the lower area of the actuator. The fixed contact element 6 and the contact spring 7 terminate therein. They can be connected to the connection lines 10 here. The connection space 5 is embodied open on both sides.

The contact spring 7 has a curved area 9 and a hammer-shaped area 8. The curved area 9 penetrates the fixed contact element 6 in the area of the double contact blades and projects into the channel 3. A downward movement by the slide 4 as a result of the belt tongue being inserted into the buckle acts on the contact spring 7 and interrupts the contact.

The hammer-shaped area 8 of the contact spring 7 forms the seating surface on both sides on the blades of the fixed contact element 6 and thus the two contact points of the actuator.

The contact blades of the fixed contact element 6 in the contacted condition are under a bending stress and are therefore elastically curved. When the contact spring is actuated, they move back into the uncurved condition. Thus contact friction occurs in the contact area. This also occurs when the contact is made when the contact spring 7 springs back into the unactuated condition when the slide 4 moves upward.

The actuator embodied in this manner can be assembled fully automatically. The fixed contact element 6 and the contact spring 7 can be inserted by means of appropriate automated equipment, specifically in a sequence in which the contact spring 7 is inserted first and then the fixed contact element 6 is inserted. After insertion, this is then pushed into its final installed position. Once the interior housing space 2 is closed by means of a cover, the functioning of the actuator can be tested. Then the connection lines 10 can be attached. This is largely automated using crimping or welding, since the housing 1 is open on both sides in the area of the connection space 5.

The contact space 2 is embodied closed from the top, so that foreign matter cannot penetrate into the contact area. Thus protection from malfunctions due to soiling is provided.

Key

1—Actuator housing
2—Interior housing space
2a—Upper interior housing space
3—Channel
4—Slide
5—Connection space
6—Fixed contact element
7—Contact spring
8—Hammer-shaped area
9—Curved area
10—Connection lines
11—Frame

The invention claimed is:

1. An actuator for use in a buckle of a safety belt for indicating that a tongue of the belt has been inserted into the buckle and properly latched, comprising:
    first and second contact elements; and
    a housing and a slide;
    said contact elements each consisting of leaf spring material and including contact-effecting portions;
    a contact-effecting portion of said first contact element including two contact blades, said blades being adjacently disposed and separated by a predetermined space;
    said housing including non-movable walls, said walls defining a space in which both contact-effecting portions are contained, the said walls substantially preventing incursion of foreign matter into said space;
    said walls defining an open-ended channel disposed adjacent to said space and partitioned from said space by a portion of said walls;
    said second contact element including a portion projecting into said channel and said second contact element being actuated by moving a slide in said channel so that respective contact-effecting portions are brought into or out of contact with each other.

2. The actuator claim 1, wherein said protecting portion of said second contact element projects into said channel between said blades of said first contact element, said projecting portion of a second contact element is engageable by the slide to move the contact-effecting portion of the second contact element out of contact with the contact-effecting portion of the first contact element.

3. The actuator claim 1, wherein said projecting portion of the second contact element is engageable by a slide to move the contact-effecting portion of the second contact element into contact with the contact-effecting portion of the first contact element.

4. The actuator claim 2 or 3, wherein the second contact element comprises a contact spring and the two blades of the first contact element are elastically bendable independently of one another when the contact-effecting portions thereof are contacted by the contact-effecting portion of the second contact element.

5. The actuator claim 4, wherein the contact-effecting portion of said contact spring is of hammer-like shape and the projecting portion of said contact spring is curved.

6. The actuator claim 1, further comprising a frame disposed at an end of the housing opposed to an end of the housing adjacent wherein the contact-effecting portions of said contact elements are housed, the frame defining a space for projection thereinto of connections of electrical wires to the contact elements.

7. A switch for a belt buckle for restraining systems of motor vehicles for indicating that the tab of the belt has been inserted into the belt buckle and locked properly, comprising:
    first and second contacting metal sheets;
    one of the contacting metal sheets being formed at its contacting end as a double-contacting tab, the contacting end being disposed within the belt buckle;
    wherein contacting regions of the contacting metal sheet are provided in an upper interior space of the switch housing;
    the interior space being protected from foreign materials;
    the switch housing being disposed within the belt buckle;
    a contacting metal sheet being constructed as a contacting spring;
    the spring including a hammer-shaped region at the contacting end and a central arc-shaped region;
    the arc-shaped region of the contacting spring protruding into a channel;
    the channel being disposed at a side of the interior space of the housing; and
    the contact being switchable by moving a slide in the channel.

8. The switch of claim 7, wherein the contacting metal sheets mutually penetrate one another, the contact being breakable by the action of the slide on the contacting spring.

9. The switch of claim 7, wherein the contacting metal sheets do not mutually penetrate one another, the contact being closable by moving the slide against the contacting spring.

10. The switch of any one of claims 7–9, wherein the two contacting tabs of the fixed contacting metal sheet being independently deflectable away from one another by the hammer-shaped region of the contacting Spring.

11. The switch of any one of claims 7 to 9, wherein the switch housing, at an end opposite to the contacting region, contains a frame, the frame being open at its front and back and surrounding the contacting space, the cable-connecting sites of the two contacting metal sheets protruding from the contacting space.

* * * * *